US010459722B2

(12) United States Patent
Dapoz (10) Patent No.: US 10,459,722 B2
(45) Date of Patent: Oct. 29, 2019

(54) DEVICE, SYSTEM, AND METHOD FOR SECURE SUPERVISOR SYSTEM CALLS

(71) Applicant: Wind River Systems, Inc., Alameda, CA (US)

(72) Inventor: Mark Dapoz, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 237 days.

(21) Appl. No.: 14/950,725

(22) Filed: Nov. 24, 2015

(65) Prior Publication Data

US 2017/0149682 A1    May 25, 2017

(51) Int. Cl.
| | | |
|---|---|---|
| *G06F 9/00* | (2006.01) | |
| *G06F 21/00* | (2013.01) | |
| *H04L 29/06* | (2006.01) | |
| *G06F 21/44* | (2013.01) | |

(52) U.S. Cl.
CPC ............... *G06F 9/00* (2013.01); *G06F 21/00* (2013.01); *G06F 21/44* (2013.01); *H04L 63/10* (2013.01); *H04L 63/126* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 2012/0284702 | A1* | 11/2012 | Ganapathy | G06F 9/468 717/174 |
| 2012/0317609 | A1* | 12/2012 | Carrara | G06F 21/6218 726/1 |
| 2014/0006804 | A1* | 1/2014 | Tkacik | G06F 21/53 713/192 |
| 2014/0013325 | A1* | 1/2014 | Shimoni | G06F 9/45558 718/1 |
| 2015/0074764 | A1* | 3/2015 | Stern | H04L 63/06 726/4 |
| 2015/0339482 | A1* | 11/2015 | Wurster | G06F 21/62 726/30 |

* cited by examiner

Primary Examiner — Hermon Asres
(74) Attorney, Agent, or Firm — Fay Kaplun & Marcin, LLP (57) ABSTRACT

A device, system, and method processes a request for allocation of a resource of an electronic device utilizing a secure supervisor system call. The method includes receiving a call from a requesting application of the electronic device, the call indicating the request for allocation of the resource of the electronic device. The method includes determining whether the call is authorized to receive the resource of the electronic device. The determining includes determining whether the call includes a signature that is generated based upon a predetermined signature operation and determining whether the signature is valid based upon the predetermined signature operation when the call includes the signature. The method includes processing the request for the allocation of the resource when the call is determined to be authorized.

12 Claims, 4 Drawing Sheets

DEVICE, SYSTEM, AND METHOD FOR SECURE SUPERVISOR SYSTEM CALLS

BACKGROUND INFORMATION

An electronic device may include a processor that executes a variety of different types of computer-executable instructions, for example, programs, applications, modules, etc., to perform various respective functionalities. While executing these applications, the application may receive a command, which may be manually inputted by a user or may be automatically generated by another application. The command may require some resource of the electronic device. In a first example, the resource may be a processing power for the command to be performed that occupies an available capacity of the processor. In a second example, the electronic device may include storage components such as, for example, a disk drive that enables data to be stored in a general manner, and a Random Access Memory (RAM) that enables the applications to request an allocation of the RAM for temporary use while the command is executed. Accordingly, the RAM may represent another resource that is requested by the application to perform the various respective functionalities.

The electronic device may be subject to malicious attacks that may install or execute malicious software using resources of the electronic device. That is, the applications that are executed by the processor may include the intended applications such as, for example, an operating system (OS) and associated actions of the OS, but may also include unintended applications such as, for example, malicious software (malware) and associated actions of the malware. Those skilled in the art will understand that the malicious software may operate in a manner that is unknown to the user, and may utilize whatever resources available on the electronic device. The malicious software may operate in a substantially similar manner as the intended applications. For example, the malicious software may request resources, such as, for example, processing power and RAM. Because the processing power and the RAM are limited resources within the electronic device, the malicious software consumes and/or otherwise renders unavailable these resources that would otherwise be utilized by intended applications, and thereby creating a poor user experience such as, e.g., slower processing speeds.

The electronic device may be configured with settings that may restrict select operations. Specifically, a conventional implementation of system service requests utilizes a trivial security model that primarily depends upon examining an operational mode of the electronic device (e.g., supervisor mode, user mode, guest mode, etc.) at the time the request is made. Thus, when a first operational mode is determined, a first set of requests may be enabled; when a second operational mode is determined, a second set of requests may be enabled; etc. A request outside the scope of an existing operational mode of the electronic device may be rejected. For example, if the first operational mode is a supervisor mode, the first set of requests may include all possible requests. In contrast, the second operational mode may be a user mode that enables a second set of requests that is a subset of the first set of requests. Therefore, if the electronic device is determined to be in a user mode, requests that fall only within the scope of the supervisor model may be rejected. Therefore, if the malicious software were to be executed while the electronic device is operating in the supervisor mode, all requests for resources, including those undesired and/or unauthorized requests from malicious software, may would be processed.

SUMMARY OF THE INVENTION

The exemplary embodiments are directed to a method for processing a request for allocation of a resource of an electronic device, comprising: (a) receiving a call from a requesting application of the electronic device, the call indicating the request for allocation of the resource of the electronic device; (b) determining whether the call is authorized to receive the resource of the electronic device by: determining whether the call includes a signature, the signature being generated based upon a predetermined signature operation, and when the call includes the signature, determining whether the signature is valid based upon the predetermined signature operation; and (c) processing the request for the allocation of the resource when the call is determined by step (b) to be authorized.

The exemplary embodiments are directed to an electronic device, comprising: a memory including regions that are allocated for use by one or more applications; and a processor configure to receive a call from a requesting application, the call indicating a request for an allocation of a resource of the electronic device, and determine whether the call is authorized to receive the resource of the electronic device by determining whether the call includes a signature, the signature being generated based upon a predetermined signature operation, when the call includes the signature, wherein the processor is configure to determine whether the signature is valid based upon the predetermined signature operation, and process the request for the allocation of the resource when the call is determined to be authorized.

The exemplary embodiments are directed to a non-transitory computer readable storage medium with an executable program stored thereon, wherein the program instructs a microprocessor to perform operations comprising: (a) receiving a call from a requesting application of an electronic device, the call indicating a request for an allocation of a resource of the electronic device; (b) determining whether the call is authorized to receive the resource of the electronic device by: determining whether the call includes a signature, the signature being generated based upon a predetermined signature operation, and when the call includes the signature, determining whether the signature is valid based upon the predetermined signature operation; and (c) processing the request for the allocation of the resource when the call is determined to be authorized.

DETAILED DESCRIPTION

The exemplary embodiments may be further understood with reference to the following description and the related appended drawings, wherein like elements are provided with the same reference numerals. The exemplary embodiments are related to a device, a system, and a method that provides secure supervisor system calls on an electronic device. Specifically, the exemplary embodiments relate to a mechanism for generating a request to a supervisor application when an application seeks to access or use a resource of the electronic device. The exemplary embodiments provide a mechanism by which the supervisor application validates the request to provide a layer of security against malicious software accessing any resource on the electronic device.

The exemplary embodiments provide a mechanism in which a requesting application that provides a request for system services is authenticated (e.g., digitally signed using any suitable form of encryption, cryptography, or other computer security mechanisms) by a supervisor application. The supervisor application validates each request received from one or more requesting applications. Those skilled in the art will understand that this is in contrast to conventional approaches that utilize a global system setting such as, for example, a supervisor mode. The exemplary embodiments may utilize any cryptographic signing technique for the request to be signed and formatted into a call for the resource. The mechanism of the exemplary embodiments may require that any application requesting access to a resource of the electronic device provide a signed request having a secure signature, which may be generated using any suitable technique, before forwarding the request to the supervisor application. The supervisor application may then validate the signature. The request or signature may also include information that identifies the requesting application. The supervisor application may first ascertain the identity of the requesting application, e.g., by reading the identifying information included in the request or signature, before determining whether to process the request or reject the request. In this manner, a more robust and flexible security model is provided by the exemplary embodiments that does not require any hardware features (e.g., user mode, supervisor mode, etc.) to enforce security. Specifically, these mechanisms of the exemplary embodiments may enable the supervisory application to enforce security protocols against malicious software on systems that do not otherwise provide protection against malicious software for a system call mechanism (to request a resource).

It should be noted that the exemplary embodiments are described herein with regard to the resource for which the call is generated is a portion or chunk of a memory. However, the use of the memory as the resource is only exemplary. The memory may represent any resource for which a call is generated to request access to the resource, the call may be processed by the supervisor application.

Figure 1:
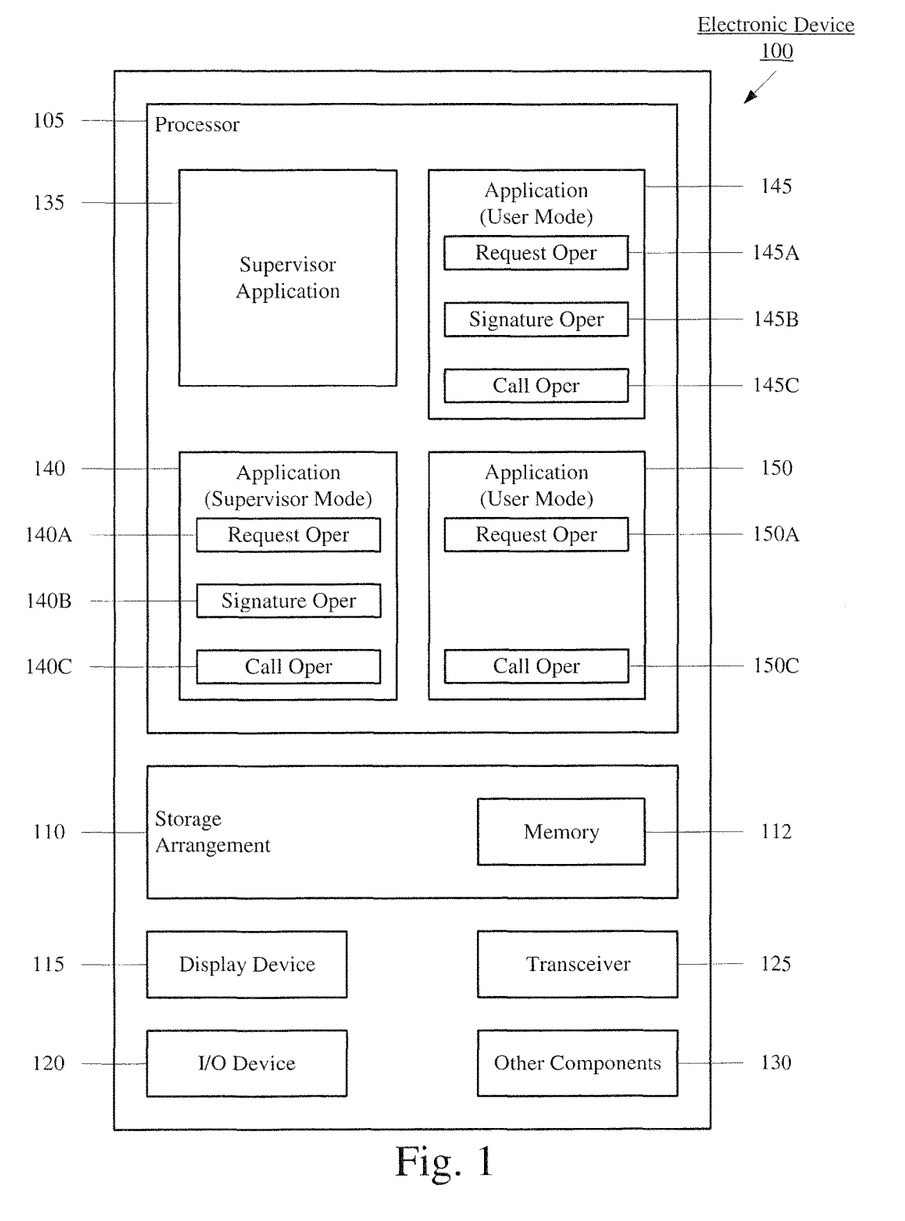
FIG. 1 shows an electronic device according to the exemplary embodiments.

FIG. 1 shows components of an electronic device 100 according to the exemplary embodiments. The electronic device 100 may be configured to execute at least one application and a supervisor application. The electronic device 100 may have at least one resource such as, for example, a memory. The electronic device 100 may represent any electronic device such as a portable device (e.g., a cellular phone, a smartphone, a tablet, a phablet, a laptop, a wearable device, etc.) or a stationary device (e.g., desktop computer). The electronic device 100 may include a processor 105, a storage arrangement 110 (which may include a memory 112), a display device 115, an input/output (I/O) device 120, and a transceiver 125. The electronic device may optionally include other components 130 such as, for example, a portable power supply, an audio I/O device, a data acquisition device, ports to electrically connect the electronic device 100 to other electronic devices, etc.

The processor 105 may be configured to execute a plurality of applications of the electronic device 100. For example, the processor 105 may be an applications processor. In a first example, the processor may execute a supervisor application 135. The supervisor application 135 may perform supervisory functionalities for the electronic device 100. For example, the supervisor application 135 may be part of an operating system controlling how routines are performed. The supervisor application 135 may also regulate operations such as, for example, work scheduling, input/output operations, error actions, a flow of work in a data processing system, etc. Furthermore, the supervisor application 135 may schedule events using task queuing and system interrupts. As will be described in further detail below, the supervisor application 135 may also allocate resources to other applications. Therefore, the supervisor application 135 may receive requests as calls from the other applications, and process the calls to determine whether to allocate the resources, and if so, how the resources may be allocated. It should be noted that the use of one supervisor application 135 is only exemplary. The exemplary embodiments may also be adapted and modified for use with at least one supervisor application. For example, in the electronic device 100, the processor 105 may execute the supervisor application 135 and at least one further supervisor application.

It should be noted that the supervisor application 135 being a supervisor is only exemplary. For example, the supervisor application 135 may also be embodied as a hypervisor or a virtual machine monitor (VMM). Those skilled in the art will understand the hypervisor or VMM may be embodied as software, firmware, or hardware that creates and runs virtual machines. The electronic device 100 may be the host machine of the hypervisor running one or more virtual machines. Each of the virtual machines may be referred to as a guest machine. Accordingly, the hypervisor may provide a virtual operating platform to manage execution of a guest operating system of the guest machine. Therefore, the hypervisor may provide substantially similar operations as described above with regard to the supervisor application 135, particularly with regard to receiving calls from the guest machines and process the calls to determine whether to allocate the resources, and if so, how the resources may be allocated. When using the hypervisor, at least one supervisor may be created as the hypervisor may create multiple virtual machines each of which has a supervisor. The supervisors may accordingly forward requests to the hypervisor.

The processor 105 may execute a plurality of other applications such as application 140, application 145, and application 150. The applications 140-150 may be any program that is installed on the electronic device 100. For example, the applications 140-150 may include a web browser that enables the user to retrieve information while connected to a network via the transceiver 125, communication applications (e.g., a short messaging service (SMS) module, an email module, voice and/or video communication modules, etc.), a word processing application, multimedia applications (e.g., video player, audio player, etc.), etc.

The applications 140-150 may also operate using different modes. For example, the processor 105 may be configured to utilize a first mode in which a first set of applications are allowed to be used, a second mode in which a second set of application are allowed to be used, etc. In a first example, the first mode may be a supervisor mode. The supervisor mode may enable an entirety of the applications that are installed on the electronic device 100 to be used. In a second example, the second mode may be a user mode. The user mode may enable a subset of the applications that are installed on the electronic device 100 to be used. In a third example, there may be a first user mode, a second user mode, etc. where each user mode includes a subset of the applications that are installed on the electronic device 100 to be used where each subset may be different from one another. In a fourth example, as with the hypervisor or VMM, a virtualization mode may also be used. As illustrated, the application 140 may be included in the supervisor mode and allowed to be used only when the electronic device 100 is in the supervisor mode. The applications 145, 150 maybe included in the user mode and allowed to be used when the electronic device 100 is in the supervisor mode and/or the user mode.

The applications 140-150 are also illustrated in FIG. 1 to include a plurality of operations that are performed by each of the applications 140-150. Specifically, the application 140 may include a request operation 140A, a signature operation 140B, and a call operation 140C; the application 145 may include a request operation 145A, a signature operation 145B, and a call operation 145C; and the application 150 may include a request operation 150A and a call operation 150C. As will be described in further detail below, the request operations 140A, 145A, 150A may format a request indicative of an action of the applications 140-150 that requires a resource. The signature operations 140B, 145B may generate a signature to be used in a further operation. The call operations 140C, 145C, 150C may generate the call based upon the request and the signature (if available) to be forwarded to the supervisor application 135 to be allocated the resource.

It should be noted that the applications executed by the processor 105 are only exemplary. In a first example, the processor 105 may be an applications processor. In another example, the functionality described for the applications may also be represented as a separate module, a separately incorporated component of the electronic device 100 (e.g., an integrated circuit with or without firmware), or a modular component coupled to the electronic device 100. The functionality may also be distributed throughout multiple components of the electronic device 100.

It should also be noted that the processor 105 executing the applications 140-150 is only exemplary. Those skilled in the art will understand that the processor 105 may execute any number of applications and the applications may be run using any mode. The processor 105 may also execute the applications 140-150 concurrently, individually, etc. In addition, the processor 105 may also execute the applications 140-150 manually, as initiated by the user of the electronic device, or automatically by the electronic device 100, as a background operation, etc.

It should further be noted that the processor 105 is represented as executing applications. However, those skilled in the art will understand that the processor 105 may operate in various other manners such as performing a variety of processes of the applications. The exemplary embodiments are described herein with regard to the applications generating requests and calls. However, this is only exemplary and is representative of the processor 105 performing a plurality of processes of the applications that are being executed.

The storage arrangement 110 may be a hardware component configured to store data related to operations performed by the electronic device 100. The storage arrangement 110 may include one or more storage components configured to store the data. In a first example, the storage arrangement 110 may include a general data storage component such as a disk drive. In a second example, the storage arrangement 110 may include a processing storage component (hereinafter referred as "memory" 112) such as a Random Access Memory (RAM). Those skilled in the art will understand that the disk drive may provide a large storage capacity for data to be written thereon and remain stored thereon even when power is cut to this component. For example, the disk drive may utilize magnetic features to store this data on disks. However, use of the disk drive is relatively slow as data thereon needs to be located, read, and transmitted to the appropriate component before this data can be processed. In contrast, the memory 112 provides a series of chips that loads data from the various modules such as the other modules 135 (including any OS) which may be retrieved near instantaneously. However, any loss in power results in data stored in the memory 112 to be lost. Furthermore, the memory 112 has a lesser storage capacity. Thus, regions of the memory 112 that is allocated to an application is on a temporary basis. As noted above, the memory 112 may be a resource that is allocated to the applications 140-150 that are requesting use of this resource.

The display device 115 may be a hardware component configured to show data to a user while I/O device 120 may be a hardware component configured to receive inputs from the user and output corresponding data. The transceiver 125 may enable the connection between the electronic device 100 and another electronic device. Specifically, the transceiver 125 may enable a wired or wireless connection with the further electronic device directly or indirectly such as via a network so that the information may be exchanged.

While the applications 140-150 are being used, the applications 140-150 may request the resource such as the memory 112. As functionalities are performed by the applications 140-150, the applications 140-150 may request a chunk of the memory 112 for use by the application. Again, the chunk of the memory 112 may be used for immediate data retrieval such as storing variables declared by the functionalities of the application. As noted above, the request may be defined by a call to a memory application programming interface (API) function in the programming code of the application.

According to the exemplary embodiments, a mechanism used to communicate between the supervisory application 135 and the applications 140-150 may utilize a signed request block that is validated by the supervisory application 135 for each request. For example, an API may be used for the applications 135-150 to communicate with each other. The request block may contain all the information necessary to identify the request, the source of the request (i.e., the requesting application), and/or any data the request may require such as the resource. As discussed above, the request block may be generated using the request operations 140A, 145A, 150A of the applications 140, 145, 150, respectively. According to the exemplary embodiments, the request block may be signed for validation purposes. As discussed above, the signature operations 140B, 145B of the applications 140, 145, respectively, may be used to generate the appropriate signature to be used with the request. In this manner, the call may be generated by the call operations 140C, 145C, 150C of the applications 140, 145, 150, respectively, where the calls for the applications 140, 145 are generated based upon the respective request and the respective signature while the call for the application 150 is generated based upon only the respective request.

As described above, the signature operations 140B, 145B may generate the signature. That is, the signature operations 140B, 145B may be an operation of the applications 140, 145. According to a first exemplary embodiment, the applications may perform the signature operations 140B, 145C to generate a corresponding signature to be applied to the request prior to forwarding to the supervisor application 135 as a call. However, as will be described in further detail below, this is only exemplary and according to a second exemplary embodiment, the applications may receive a pre-signed request to be converted into the call.

Initially, the applications 140, 145 may be provided the signature operations 140B, 145B in a variety of manners. In a first example, the signature operations 140B, 145B may have been provided to the applications 140, 145 when the applications 140, 145 were installed. Those skilled in the art will understand that the applications 140, 145 may be applications that the user has manually selected for installation on the electronic device 100. Accordingly, the user may have been presented with installation options. When prompted, the user may enable the applications 140, 145 to be provided the signature operations 140B, 145B. For example, the installation procedure may prompt the user whether the application is a trusted application. The indication that the application being installed is trusted may enable the application to be provided the signature operation. In another example, the installation procedure may prompt the user whether the application is to be provided the signature operation. Therefore, with the signature operations being provided during the installation procedure, the supervisor application 135 may have information indicating an identity of the applications that have properly been configured with the signature operation.

In a second example, the signature operations 140B, 145B may have been provided to the applications 140, 145 when the applications are indicated as trusted after installation. For example, the supervisor application 135 may have a user interface of known applications that have been installed on the electronic device. The supervisor application 135 and/or another operation such as, for example, of the operating system may populate a list of the installed applications that may have been installed by the user, automatically by the operating system or other application, through an inadvertent installation (as with malicious software), etc. The user may indicate which of the applications are to be provided the signature operation. In this manner, the applications that have the signature operation may be dynamically configured based upon a preference of the user. Therefore, the supervisor application 135 may again have information indicating an identity of the applications that have properly been configured with the signature operation.

With the signature operation itself being provided to the applications, the signature may be generated by the application at a time of execution of the signature operation. That is, when the request is determined, the signature operation may be performed during this procedure of generating the corresponding call for the request. However, such a timing of generating the signature is only exemplary. As will be described in another exemplary embodiment, the signature may be generated at various other times.

Those skilled in the art will understand that there are a variety of other manners in which the applications may be provided the signature operation beyond the manners discussed above. The exemplary embodiments may also incorporate these other manners of providing the signature operation. However, it should be noted that the manners of providing the signature operation may utilize a trust procedure in which only applications that are known to be trusted are provided the signature operation.

As noted above, the applications may also receive a pre-signed request to be converted into the call. More generally, the applications may receive a signature to be used in generating the call. The signature may be received as the signature itself or as part of a signed request. That is, the application generating the call may not perform the signature operation as the signature is being received from outside of the application. In a first example, the signature operation may have been performed by the supervisor application 135. Accordingly, the signature may be received directly from the supervisor application 135. The signature received from the supervisor application 135 may be used as part of a request, which may be converted into the call function that is subsequently forwarded to the supervisor application 135 for processing. In a second example, the signature being used by a first one of the applications 140-150 may be performed by a signature operation of another one of the applications 140-150. Those skilled in the art will understand that there may be a chain of events used in generating the call by a plurality of applications. Accordingly, if one of the applications (particularly the originating application of the process) has the signature operation, the signature may be transferred along the chain to be used in the call. Furthermore, the chain of events may include a plurality of calls. The signature may be applied to each of these calls due to the relation in the chain. With the signature operation being performed at a previous time, the request and/or call may be "pre-signed" for use by the applications receiving the signature.

The signature operation of the exemplary embodiments may also utilize any known mechanism to generate the signature. Specifically, any known cryptography mechanism may be used for the signature. In a first example, the signature operation may generate a signature that is a hash-based message authentication code (HMAC). Those skilled in the art will understand that the HMAC may calculate a message authentication code (MAC) using a cryptographic hash function and a secret cryptographic key. The MAC may be used to simultaneously verify data integrity and authentication of a message such as the call. In calculating the HMAC, any cryptographic hash function may be used such as MD5, SHA-1, etc. which results in HMAC-MD5, HMAC-SHA1, etc., respectively.

In a second example, the signature operation may generate a signature that is based upon a RSA. Those skilled in the art will understand that the RSA a public-key cryptosystem used to secure data transmission such as the call. The RSA includes an encryption key that is public and differs from a decryption key that is secret. The asymmetry is based on a factoring problem involving factoring a product of two large prime numbers. Specifically, RSA creates and publishes the public key based on two large prime numbers that are kept secret and an auxiliary value. The public key may be used to encrypt a message (e.g., a signature) and only an application (e.g., the supervisor application 135) that knows the secret prime numbers is capable of decoding the message.

It should be noted that the use of the HMAC and the RSA for generating the signature is only exemplary. That is, the exemplary embodiments may utilize any known cryptography mechanism to generate the signature. In fact, the use of the cryptography mechanism is also only exemplary. The exemplary embodiments may utilize any known trusted message passing mechanism to provide the validation feature which will be described in further detail below.

Once the applications 140-150 have generated the request and using the signature operation described above, the corresponding call may be generated and forwarded to the supervisor application 135. In a specific example, the call comprising the service request may use available hardware mechanisms based upon the type of system of the electronic device 100. For example, the call may be formatted as a VMCALL instruction as is used in an Intel-Architecture. It should be noted that when the electronic device 100 includes a plurality of supervisor applications and/or when there are a plurality of supervisors (e.g., from the hypervisor), the applications 140-150 may forward the corresponding call to each of the supervisor applications and/or supervisors based upon which supervisor applications and/or supervisors are to receive the call.

Upon receiving each call, the supervisor application 135 may validate the signature. The signature may be used for various aspects such as identifying the requestor and ensuring a data integrity. For example, using the above cryptographic mechanisms of generating the signature, the key in the HMAC or the prime numbers of the RSA may provide the supervisor application 135 the necessary information in determining the validity of the signature and decrypt the information. If the validation succeeds, the supervisor application 135 may process the request included in the call. However, if the validation fails, the supervisor application 135 may reject the request. With the embodiment including a plurality of supervisor applications and/or supervisors, each supervisor application and/or supervisor that receives the call may perform the validation of the signature. Accordingly, the request may be processed upon each supervisor application and/or supervisor validating the signature. However, when at least one supervisor application and/or supervisor that receives the call determines that the signature is invalid, the request may be rejected (even though another supervisor application and/or supervisor has validated the signature).

It is noted that the above mechanism may utilize a two tiered approach in validating the signature. In a first analysis, the supervisor application 135 may determine whether the information decrypted from the call includes a signed request. That is, the first analysis may determine whether a signature has been included in the call. The absence of the signature may be an indication that the request is unauthorized, and therefore, the supervisor application 135 rejects the request. If the supervisor application 135 determines that a signature is included, a second analysis may involve determining the validity of the signature using the appropriate cryptographic mechanism.

Figure 2:
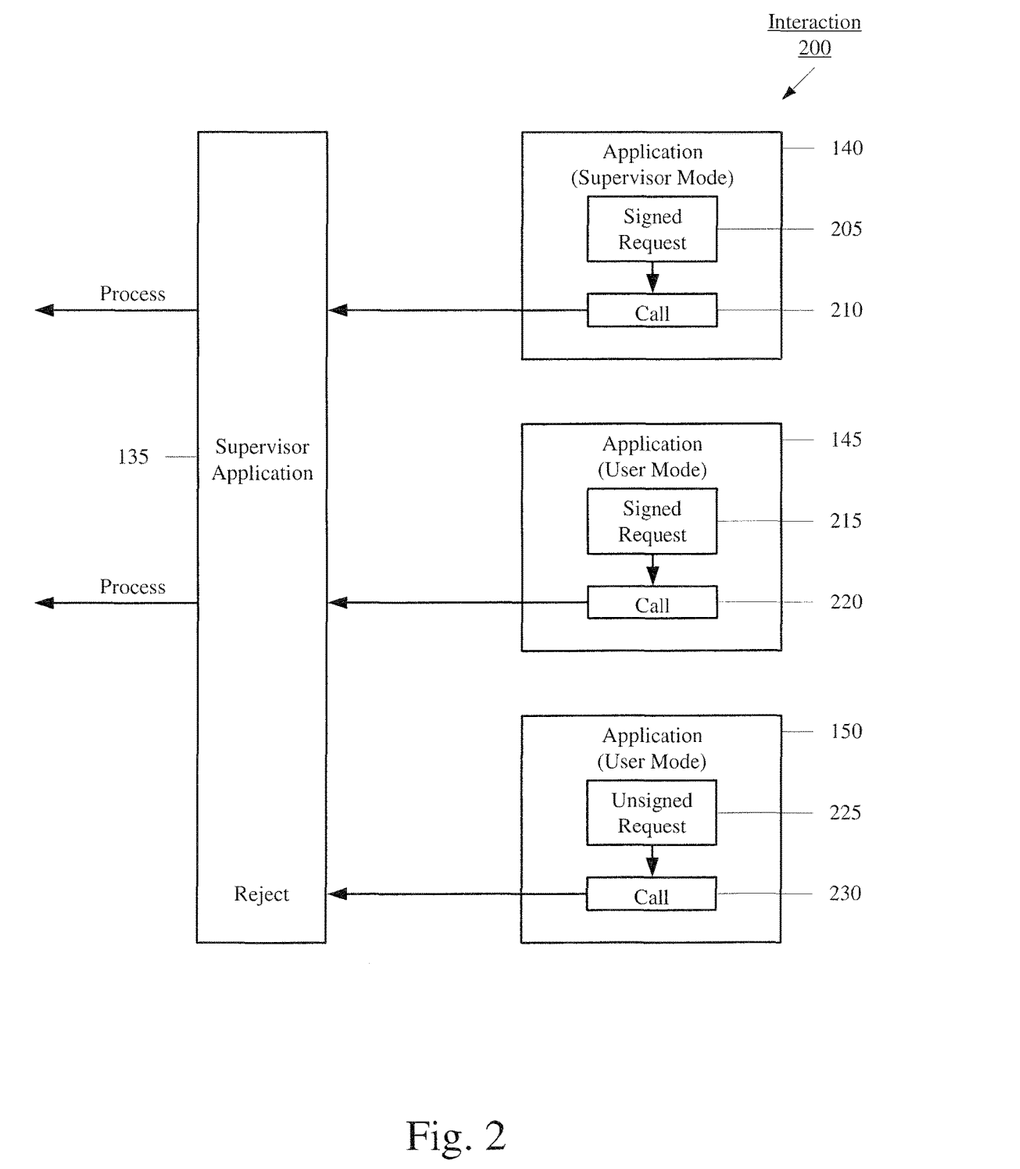
FIG. 2 shows an interaction for calls between a supervisor application and other applications according to the exemplary embodiments.

FIG. 2 shows an interaction 200 for calls between the supervisor application 135 and the other applications 140-150 according to the exemplary embodiments. The interaction 200 is based upon the description above with regard to the electronic device 100 in which the application 140 is used in a supervisor mode and has the signature application 140B, the application 145 is used in a user mode and has the signature application 145B, and the application 150 is used in the user mode and does not have a signature application. The interaction 200 also illustrates passing of messages in a constructive manner. However, those skilled in the art will understand that the interaction 200 may utilize known message passing mechanisms such as an API.

With regard to the application 140 running in the supervisor mode, the application 140 may utilize the signature using the mechanism described above. When the application 140 has an action to be performed and requires a resource, the application 140 may determine a request using the request operation 140A. The request may be associated with a signature to generate a signed request 205. The signed request 205 may be generated by the signature operation 140B. The signature may either be generated by the application or be received from another application. Thereafter, the signed request 205 may be used to generate, e.g., formatted into, a call 210 to be forwarded to the supervisor application 135. When the supervisor application 135 receives the call 210, the call 210 may be decrypted to first determine that a signature is present. The supervisor application 135 may then validate the signature. If the signature is validated, the request may be processed. Otherwise, the supervisor application 135 rejects the call 210. A substantially similar operation may be performed for the application 145 running in the user mode and generating a signed request 215 and a call 220.

In contrast to the applications 140, 145 that utilize the signature operation 140B, 145B, respectively, the application 150 does not include this operation. Accordingly, the application 150 may not be trusted (e.g., malicious software), or may be manually selected to not be provided this operation. Without the signature operation, the application 150 generates an unsigned request 225 that is converted into a call 230. The call 230 may be forwarded to the supervisor application 135 that determines that the call 230 lacks a signature. Accordingly, the supervisor application 135 may reject the request.

In another example, the application 150 may include an unauthorized signature operation (not shown). The application 150 may accordingly generate a signature to be used with the request and the call. The call with the invalid signature may be forwarded to the supervisor application 135. Since the signature is determined to be invalid, the supervisor application 135 may again reject the request.

In a further example, the application 150 may have a signature that is encrypted using the appropriate mechanism. The signature from the application 150 may be included in the request and/or the call. In certain scenarios, the supervisor application 135 may decrypt the call, and determine the signature may even be valid. However, the call may also include the identity of the requesting application, which indicates that it is not an authorized call or request for resources. The application 150 may not be included in the allowed applications that may be allocated the resource. Accordingly, the supervisor application 135 may still reject the request.

The exemplary embodiments may utilize a signature for each call that corresponds to a request for resources. The signature may be generated by the application or may be received from another application (including the supervisor application). Because only authorized applications may be permitted access to the signature, applications that are unauthorized may not receive the signature nor generate its own signature (since the unauthorized application does not have access to the signature operation). Accordingly, malicious software, which is an unauthorized application, does not have access to the signature. Even if the unauthorized application were to access the signature or generate a signature, the exemplary embodiments may also validate the signature based on an identity of the source(s) for the request or call, such as, for example, an identity of the application that generated the signature, an identity of the application generating the call, etc. Accordingly, malicious software, which should not be able provide proper identity of its sources, would still be rejected by the supervisor, and the request would not be processed.

Figure 3:
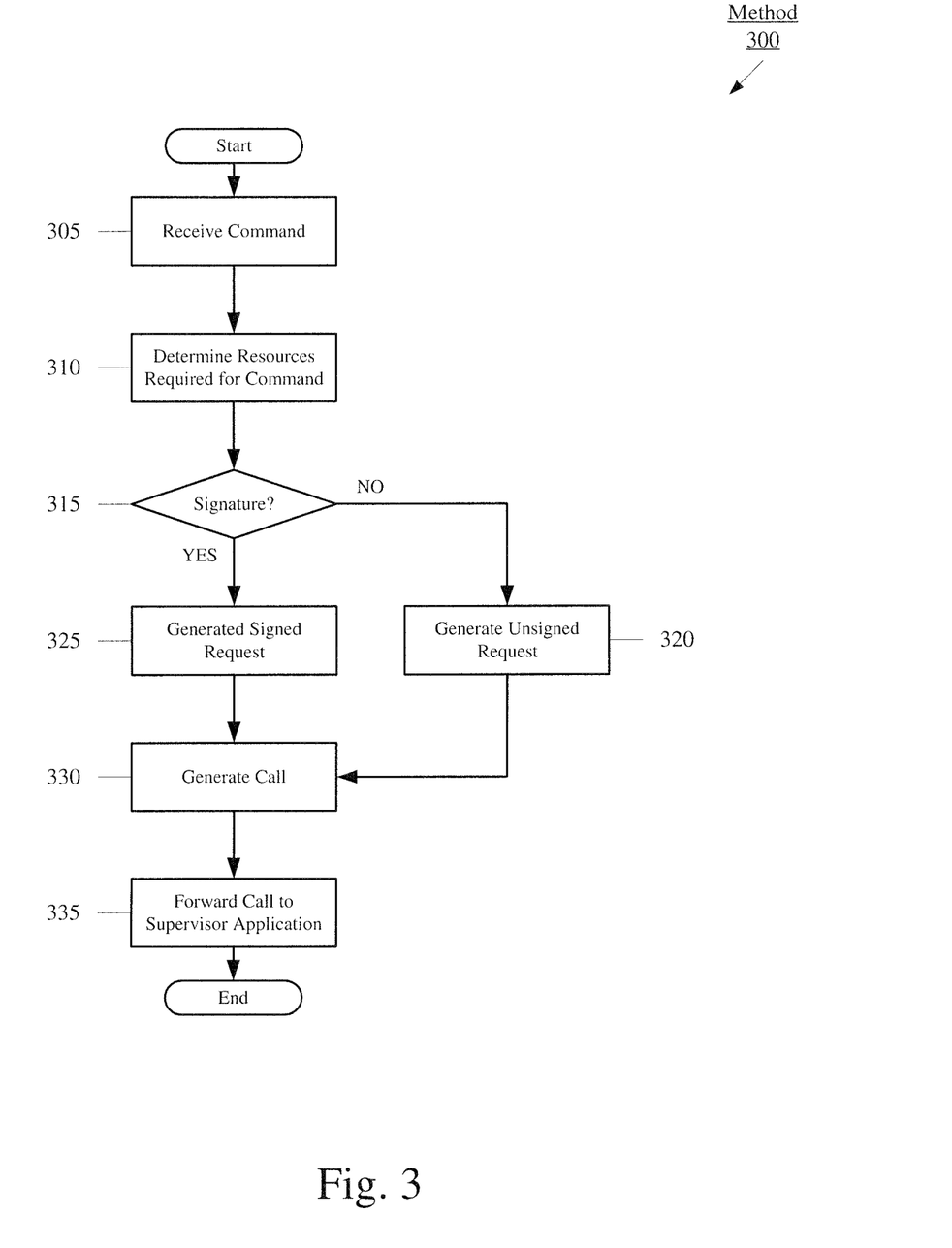
FIG. 3 shows a method for generating a call by an application to request a resource according to the exemplary embodiments.

FIG. 3 shows a method 300 for generating a call by the applications 140-150 to request a resource according to the exemplary embodiments. The method 300 may relate to an application-side set of operations in requesting the resource, particularly the applications 140-150. It is again noted that the applications 140-150 may perform the method 300 for each request for a resource of the electronic device 100. The method 300 will be described with regard to the electronic device 100 of FIG. 1 and the interaction 200 of FIG. 2.

In step 305, the application receives a command or an action which requires a resource. The command may be manually received from the user or may be automatically generated by the application. For example, the command may be to delete a file associated with the application. In step 310, the application determines the resources required for the command such as whether the memory 112 is required, whether the corresponding portion in the storage arrangement 110 storing the file is to be deleted, etc. Accordingly, the request operation may generate the request for this command.

In step 315, the application determines whether there is a signature to be applied to the request. Specifically, the application via the signature operation may determine whether the signature is to be generated by the application using the predetermined cryptographic mechanism or apply a received signature as when the command relates to a chain such that the signature is generated by another application or generated by the supervisor application 135. If the application is missing the signature operation, the application continues the method 300 to step 320 where an unsigned request is generated. For example, application 150 generates the unsigned request 225. However, if the application has the signature operation, the application continues the method 300 to step 325 where a signed request is generated. For example, the applications 140, 145 generate the signed requests 205, 215, respectively.

Once the request has been generated that either includes the signature or lacks the signature, in step 330, the application via the call operation generates a corresponding call. For example, the calls 210, 220, 230 are generated by the applications 140, 145, 150. The call corresponds to the command or action that requires the resource and also includes the other information such as, for example, which resource and an identity of the requesting application. Subsequently, in step 335, the application forwards the call to the supervisor application 335.

Figure 4:
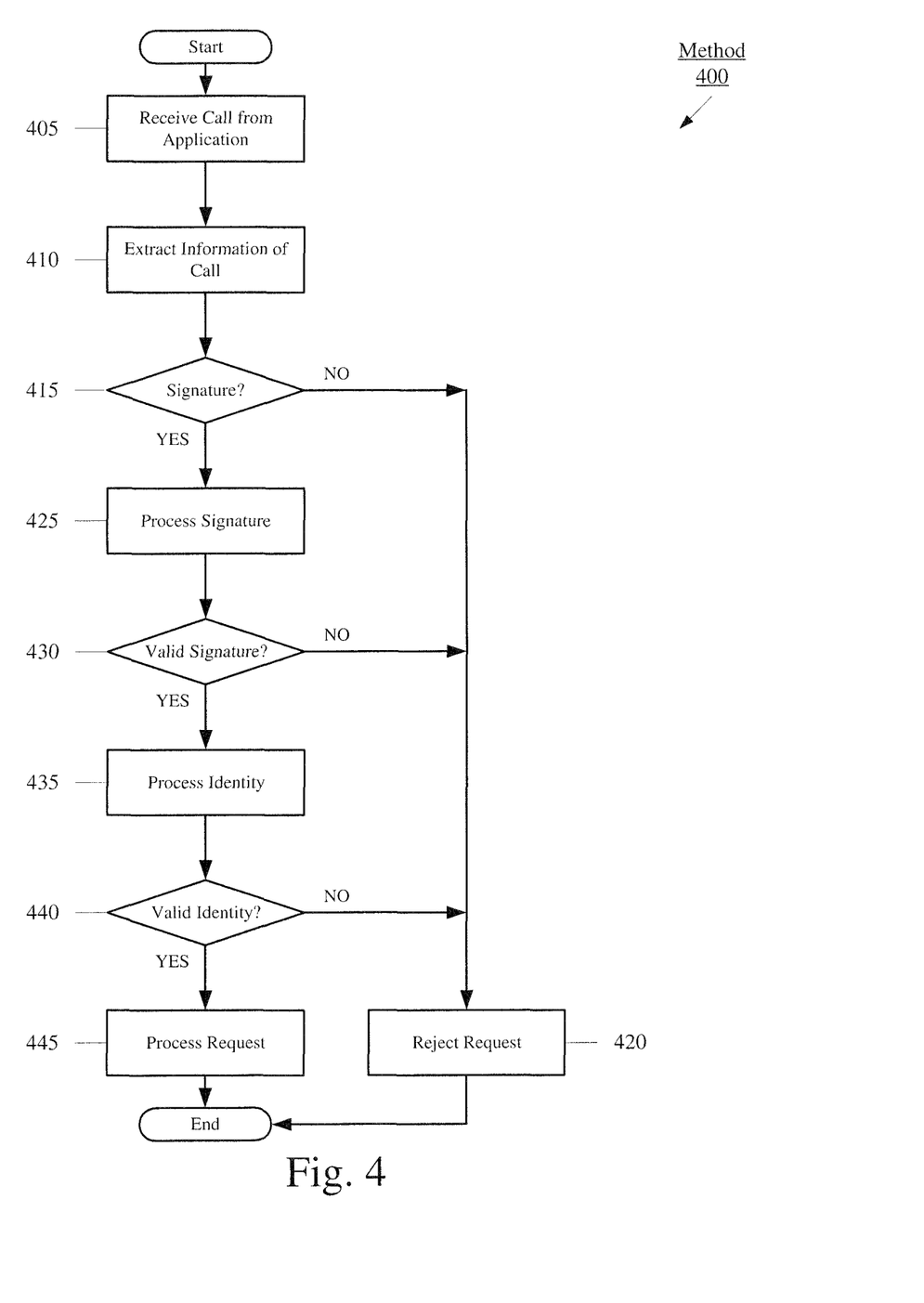
FIG. 4 shows a method for processing a request by a supervisor application according to the exemplary embodiments.

FIG. 4 shows a method 400 for processing a request by the supervisor application 135 according to the exemplary embodiments. The method 400 may relate to a supervisor-side set of operations in processing the request for the resource. It is again noted that the supervisor application 135 may perform the method 400 for each call that is received from the requesting application. The method 400 will be described with regard to the electronic device 100 of FIG. 1 and the interaction 200 of FIG. 2.

In step 405, the supervisor application 135 receives the call from the requesting application. As discussed above, the supervisor application 135 may communicate with the other applications 140-150 via an API. Using this mechanism, the call may be received by the supervisor application 135 from the requesting application. In step 410, the supervisor application 135 may extract the information from the call. Specifically, the supervisor application 135 may decrypt the data included in the call.

In step 415, the supervisor application 135 determines whether the call includes a signature. As discussed above, the inclusion of the signature may provide a first verification as to whether the call is authorized—and thus, whether the request is to be processed and the requested resource is to be allocated to the requesting application. If the supervisor application 135 determines that the call lacks a signature, the supervisor application 135 continues the method 400 to step 420. In step 420, the supervisor application 135 rejects the request included in the call.

If the supervisor application 135 determines that the call includes a signature, the supervisor application 135 continues the method 400 to step 425. In step 425, the supervisor application 135 processes the signature. For example, depending upon the cryptographic mechanism such as HMAC or RSA, the supervisor application 135 may utilize a decrypting key or known prime numbers to determine the validity of the signature. If the supervisor application 135 determines that the signature is invalid, the supervisor application 135 continues the method 400 to step 420 and the request is rejected.

If the supervisor application 135 determines that the call includes a signature and the signature is a valid signature, the supervisor application 135 continues the method 400 to step 435. In step 435, the supervisor application 135 processes the identity. As discussed above, the call may have an identity of the requesting application included therein. If the call is part of a chain of events, each identity in the chain may also be included for verification purposes. The supervisor application 135 may also have access to information indicating the authorized applications that may be allocated resources (e.g., from an installation procedure or manual indication). If the supervisor application 135 determines that the identity is invalid, the supervisor application 135 continues the method 400 to step 420 and the request is rejected. However, if the supervisor application 135 determines that the identity is valid, the supervisor application 135 continues the method 400 to step 445 and the request is processed (and the resource may be ultimately allocated, if available).

It should be noted that the method 400 may include further steps. For example, whenever the supervisor application 135 determines that a request included in a call received from the requesting application is rejected, the supervisor application 135 may generate an alert or perform a subsequent action. The alert may provide a user interface that indicates to the user that an unauthorized application (via an identity being shown) is attempting to have resources allocated to the unauthorized application. The user may then perform actions to address this alert. The subsequent action may be a cleaning operation such as when the unauthorized application is malicious software. In another example, when there are a plurality of supervisor applications, after step 445, there may be a determination as to whether there is at least one further supervisor application that received the call. If there is a further supervisor application that received the call, the method 400 returns to step 410 to perform steps 410-445 for each further supervisor application.

The exemplary embodiments provide a security mechanism where applications that request allocation of a resource utilize a signature that is validated by a supervisor application. The signature ensures that only authorized applications are allowed use of the resource by processing the request whereas unauthorized applications have requests rejected. The inclusion of the signature may provide a first verification that the application is authorized. The validation of the signature may provide a second verification that the application is authorized. The identification included in the call may provide a third verification that the application is authorized.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method for processing a request for allocation of a resource of an electronic device, comprising:
at a hypervisor of the electronic device:
(a) receiving a call from a first application of the electronic device, the call indicating the request for allocation of the resource of the electronic device;
(b) determining whether the first application is authorized to receive the resource of the electronic device by:
determining whether the call includes a signature, wherein the signature is received by the first application from a second application, and
when the call includes the signature, determining whether the signature is valid based upon a predetermined signature operation, wherein the predetermined signature operation is provided to the second application when the second application has been indicated as trusted, wherein the second application has been indicated as trusted based upon at least one of an installation procedure and a manual indication;
when the call does not include the signature, determining an identity of the first application and the second application, wherein the call includes the identity of the first application and the second application; and
determining whether the identity of the first application and the second application corresponds to an authorized application;
(c) processing the request for the allocation of the resource when the first application is determined by step (b) to be authorized.

2. The method of claim 1, further comprising:
(d) rejecting the request when the first application is determined by step (b) to not be authorized.

3. The method of claim 1, wherein the predetermined signature operation uses one of a hash-based message authentication code (HMAC) and a RSA.

4. The method of claim 1, wherein the signature is included in each part of a chain of requests.

5. The method of claim 1, wherein the second application is a supervisory application.

6. The method of claim 1, wherein the resource is a memory of the electronic device.

7. An electronic device, comprising:
a memory including regions that are allocated for use by one or more applications; and
a processor configured to execute a hypervisor, wherein the hypervisor manages execution of a virtual machine, the hypervisor configured to:
receive a call from a first application of the virtual machine, the call including a signature and indicating a request for an allocation of a resource of the electronic device, wherein the signature is received by the first application from a second application,
determine whether the first application is authorized to receive the resource of the electronic device by determining whether the signature is based upon a predetermined signature operation, wherein the predetermined signature operation is provided to the second application when the second application has been indicated as trusted, wherein the second application has been indicated as trusted based upon at least one of an installation procedure and a manual indication,
when the first application is determined to be authorized, process the request for the allocation of the resource, and
when the call does not include the signature, determine an identity of the first application and the second application, wherein the call includes the identity of the first application and the second application and determine whether the identity of the first application and the second application corresponds to an authorized application.

8. The electronic device of claim 7, wherein the hypervisor rejects the request when the first application is determined to not be authorized.

9. The electronic device of claim 7, wherein the predetermined signature operation uses one of a hash-based message authentication code (HMAC) and a RSA.

10. The electronic device of claim 7, wherein the signature is included in each part of a chain of requests.

11. The electronic device of claim 7, wherein the second application is a supervisory application.

12. A non-transitory computer readable storage medium with an executable program stored thereon, wherein the program instructs a microprocessor to perform operations comprising:
at a hypervisor of the microprocessor:
(a) receiving a call from a first application of an electronic device, the call indicating a request for an allocation of a resource of the electronic device;
(b) determining whether the first application is authorized to receive the resource of the electronic device by:
determining whether the call includes a signature, wherein the signature is received by the first application from a second application, and
when the call includes the signature, determining whether the signature is valid based upon a predetermined signature operation, wherein the predetermined signature operation is provided to the second application when the second application has been indicated as trusted, wherein the second application has been indicated as trusted based upon at least one of an installation procedure and a manual indication;
when the call does not include the signature, determining an identity of the first application and the second application, wherein the call includes the identity of the first application and the second application; and
determining whether the identity of the first application and the second application corresponds to an authorized application;
(c) processing the request for the allocation of the resource when the first application is determined to be authorized.

* * * * *